Nov. 13, 1956

L. BROWNSTEIN

2,770,204

METHOD AND APPARATUS FOR FORMING A CLOSED
LOOP OF TAPE THREADED THROUGH A BUCKLE

Filed July 5, 1955

INVENTOR
LOUIS BROWNSTEIN.

BY

ATTORNEY.

United States Patent Office 2,770,204
Patented Nov. 13, 1956

2,770,204

METHOD AND APPARATUS FOR FORMING A CLOSED LOOP OF TAPE THREADED THROUGH A BUCKLE

Louis Brownstein, Brooklyn, N. Y.

Application July 5, 1955, Serial No. 519,785

21 Claims. (Cl. 112—2)

This invention relates to the threading of buckles, and is a continuation-in-part of my copending application filed August 6, 1954, bearing Serial No. 448,293 and which has matured into Patent No. 2,715,984, granted August 23, 1955.

In the said prior application, the apparatus and method of the invention described therein is directed to the automatic threading of tape through a buckle frame containing three transverse slots, both the short and long ends of the tape extending through the foremost slot. The present invention is directed to another threading operation, performed particularly—although not necessarily—upon a buckle already threaded with a first tape by my prior invention, whereby an additional short section of tape is independently inserted through the rear slot of the buckle, looped rearwardly and sewed together, so that the entire buckle, with both threaded tapes, constitute a completed article adapted for operative use on various types of garments. In the accomplishment of the steps of the present invention, certain mechanisms of said prior invention are employed coactively with certain other mechanisms, to produce the desired result.

It is, accordingly, within the contemplation of this invention to provide a method and apparatus which is adapted for coactive use with the said invention of the parent application, whereby the assembly of said additional section of tape is effected continuously and automatically, without interrupting the threading of said first tape. And in this aspect of my invention it is a further object to effect a sewing-together of the free ends of said additional or second tape by means operatively associated with the threading mechanism for said first tape.

Further objects of my invention are to feed a length of tape in intermittent feeding movements properly synchronized and timed with cutting, looping and sewing mechanisms.

It is a further objective to provide means for moving said short section of tape, after it has operatively been threaded through the rear slot of the buckle and folded, towards the sewing mechanism and into proper position whereby a truly transverse line of stitching is formed, holding together the rearmost ends of said short section of tape.

Other objects, features and advantages will appear from the drawings and the description hereinafter given.

Referring to the drawings,

Figure 18 is a view like that of Figure 17, showing the presser foot and sewing feeds in their respective operative positions.

Figure 19 is a somewhat enlarged fragmentary plan view of the most advanced portion of the platform, with the presser foot removed, showing the two coacting sewing machine feeds and the buckle and tape in position on the platform.

Figure 20 shows cam motion diagrams of the main operative components of my machine, illustrated to show the timed relation between the operative movements of said components.

Referring to Figures 1 to 5, the buckle 10 and the tape section generally designated 11 in threaded engagement with buckle 10 constitute an assembly effectuated by the method and apparatus of my invention described in said Patent No. 2,715,984. It will be noted that said tape 11—which for the purpose of this specification will be called the front tape—contains upper short section 12 and lower long section 13, the intermediate portions of said tape being threaded through the three transverse slots within the buckle, to wit, the rear slot 14, intermediate slot 15 and the front slot 16.

By the buckle feeding mechanism described in my said parent application, to be hereinafter again referred to, the assembly of buckle 10 and front tape 11 is advanced progressively along the apparatus constituting the subject matter of this application until a point is reached in line with the feeding path of tape 17, which is to be threaded through rear slot 14, then bent back, cut and sewed together, to form a completed section like that shown in Figure 5.

Figures 1, 2, 3, 4:
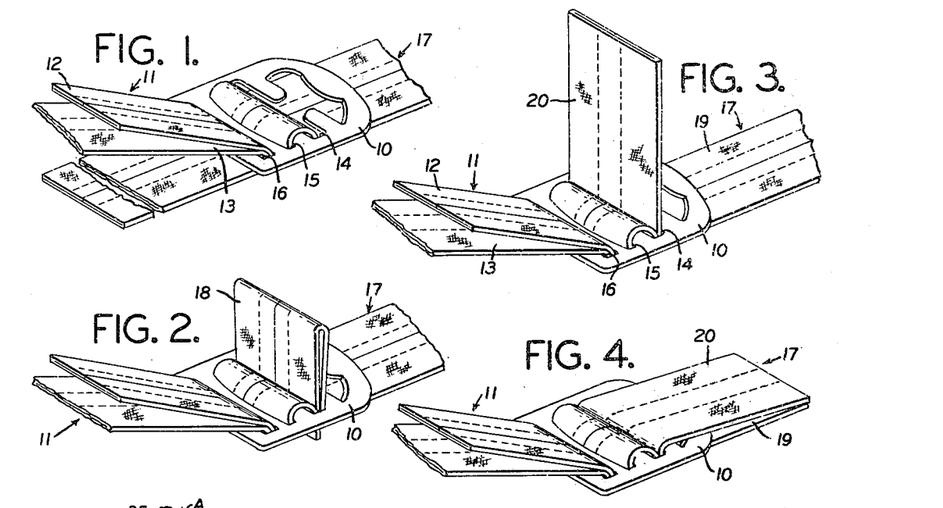
Figures 1 to 5 are fragmentary perspective views showing successive relative positions of the buckle and tape in the sequence of operations performed by the method of my invention.

Tape 17 is fed underneath the buckle 10, and then pushed upwardly through slot 14 to form a loop 18, as illustrated in Figure 2. The pushing operation continues until the entire forward portion of tape 17 is pushed up through the slot 14, substantially to the position shown in Figure 3, then the lower section 19 of tape 17, below the buckle, is operatively cut to a predetermined length. Thereafter, the assembly of buckle and tapes is further advanced; and during such advance the upper section 20 of tape 17 is folded down to the position shown in Figure 4. The advance continues until the entire assembly is brought in operative vertical alignment with sewing machine 33 and its feeding mechanism 39 and 136 (Figures 16 and 17), whereafter a line of stitching 21 is formed transverse to the length of tape 17, as illustrated in Figure 5. In this figure, which shows the buckle and tapes upon completion of the steps of my invention, the assembly constitutes a unitary article ready for attachment to a suitable garment—said article comprising the said buckle 10, the said front tape 11 and the relatively short rear tape generally designated 22.

Figures 6 to 20 illustrate the schematic arrangement of the apparatus components adapted to carry out the steps above-described with reference to Figures 1 to 5. The tape 17 is fed through a tensioning device 23, well-known to those skilled in the art, between the two coacting feed rollers 24 and 25, and then forwardly between the co-active blades 26 and 27 of a cutting mechanism, then over a supporting bar 28 and below the buckle 10 with which the said front tape 12 is interthreaded. Below the rear transverse slot 14 of buckle 10, and below the front portion 17a of tape 17, is the pusher blade 29; and above the buckle is the stationary horizontal folding bar 30 having a portion 31 thereof (Figure 6) disposed medially along the path of the buckles, and another advanced portion 32 in angular relation to portion 31 and inclined toward said sewing machine 33.

Figures 5, 6, 7, 8, 9:
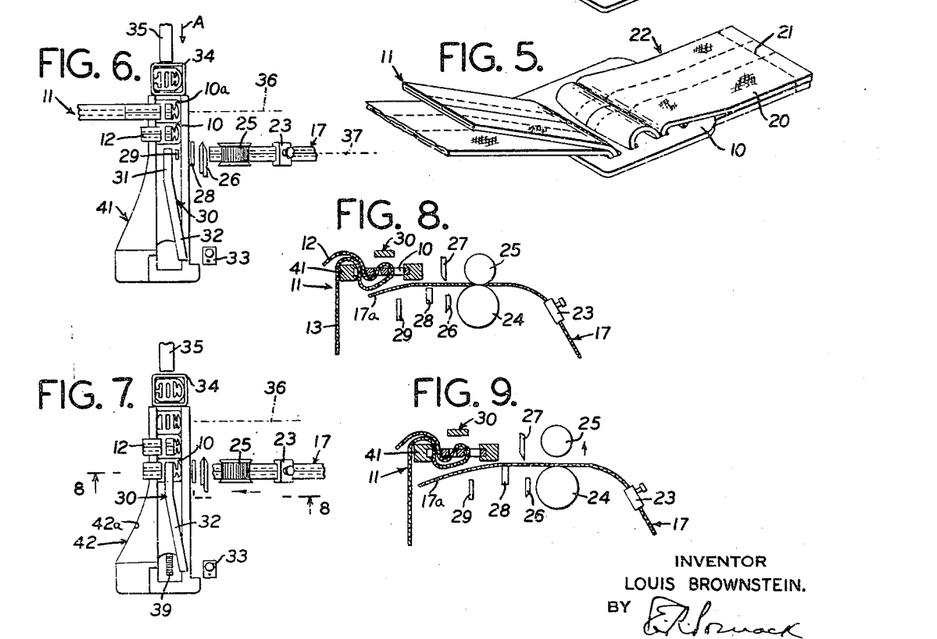
Figure 6 is a schematic plan view of certain portions of apparatus of my invention showing the buckle magazine, two buckles threaded with front tapes by the apparatus described in said parent application, the most advanced buckle being disposed in a position just prior to reaching the station for performing the steps on the second tape being fed towards said station, the buckle pusher being shown about to begin an operative movement in the direction of arrow A.
Figure 7 is a view substantially like that of Figure 6, but showing the foremost buckle advanced to the operative station in line with the path of the tape being fed towards said station in the direction of the arrow, for interthreading with the buckle.
Figure 8 is a section of Figure 7 taken substantially along line 8—8.
Figure 9 is a view substantially like that of Figure 8, showing the upper feed roller retracted in the direction of the arrow, the tape push member beginning its upward movement.
Figures 10, 11, 12, 13, 14, 15, 16, 17:
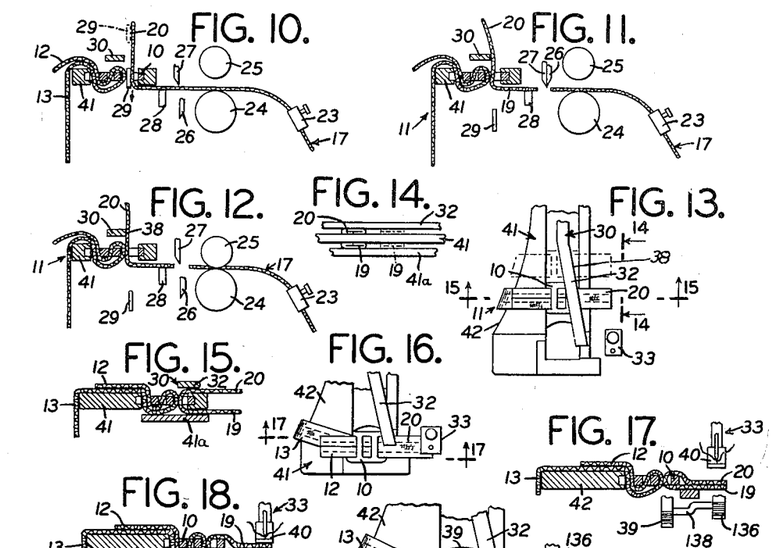
Figure 10 is a view substantially like that of Figure 9, the dot-dash position of the push member being the upper limiting position thereof, the drawing showing the push member returning to its inoperative position in the direction of the arrow.
Figure 11 is a view like that of Figure 10, showing the push member in a retracted position, and showing the cutting blades severing the tape.
Figure 12 is a view like that of Figure 11, but showing the upper feed roller in operative engagement with the tape and feeding it towards the operating station, and further showing the partly threaded tape and buckle in a somewhat advanced position, with the upwardly extending section of the tape in engagement with the folding bar.
Figure 13 is a plan view of Figure 12, the dot-dash lines indicating the position of the threaded buckle in Figure 12, the full-line position of the buckle and threaded tape being in a further advanced position.
Figure 14 is a fragmentary side view of Figure 13.
Figure 15 is a section of Figure 13 taken substantially along line 15—15, showing the two sections of the rear tape in folded condition.
Figure 16 is a fragmentary view substantially like that of Figure 15, showing the threaded buckle in position for a sewing operation.
Figure 17 is a section of Figure 16 taken along line 17—17, with the presser foot and sewing feeds in their respective retracted positions.

The said upper feed roller 25 is movable between an upper retracted position as shown in Figures 9, 10 and 11, and a lower operative feeding position in engagement with the tape 17 disposed over the lower feed roller 24, as shown in Figures 8 and 12. The upper cutting blade 27 is stationary and the lower blade 26 is movable between its inoperative position shown in Figures 8, 9, 10 and 12, and its operative position in Figure 11. The pusher member 29 is movable from its lower inoperative position shown in Figures 8 and 12, to its upper limiting operative position shown by dot-dash lines in Figure 10, where the said pusher member is in engagement with the forward end of the tape after having pushed it through the said rear slot 14.

In the apparatus of my said prior invention, buckles are disposed in a stack within vertical magazine 34 and are successively pushed in the direction of arrow A (Figure 6) by a buckle feed member 35. The stroke of each feed is exactly equal to the width of the buckle, so that not only is each buckle operatively positioned in the path (designated by the dot-dash line 36) of the tape from which the said front tape 12 is formed, but also—with each operative movement of member 35—a buckle is caused to force the contiguous advanced buckle into succesively advancing positions. When a buckle reaches the path of said tape 17—which path is designated by dot-dash line 37—it will be positioned directly over the pusher member (Figures 7 and 8). It is when the buckle 10 and its interthreaded tape 12 is in this position that the pusher 29 moves upwardly as indicated in Figures 9 and 10, to produce first the loop shown in Figure 2 and then the completely extended portion 20, as shown in Figure 3. As has previously been indicated, the cutting action had already taken place, so that as the buckle operatively advances beyond this point, it carries with it, besides the said front tape 12, the cut-off tape constituting the two sections 19 and 20, the buckle and tape slidably moving along on bar 41a.

As the assembly of buckle and tapes reaches the inclined portion 32 of bar 30, the upper section 20 of rear tape 17 comes into engagement therewith, as shown in Figure 12; and as the advance continues, the leading edge 38 of bar 30 progressively forces the upwardly extending section 20 to the right into a position underneath the inclined portion 32 of bar 30 (Figures 13, 14 and 15). In this manner the two sections 19 and 20 are brought into substantial parallel relation to each other, ready to be sewed together by the operative action of sewing machine 33. Said sewing machine has a presser foot 40 and the conventional feed 136, to be hereinafter referred to, and also another coacting supplementary feed 39 (Figures 7, 17–19 and 33) to operatively produce parallel advancing feeds of the tape as the two sections 19 and 20 thereof are operatively held together by the presser foot 40 of the sewing machine. The operative action of the sewing machine brings the buckle and interthreaded tapes to the completed position shown in Figures 16 and 19, at which the line of stitching 21 has been completed.

As appears from the drawings, the said front tape 11 extends downwardly over the platform 41 during the advance of the buckle towards the sewing machine. It will be observed that said platform has an outwardly flared portion 42 directed away from the sewing machine 33. As shown in Figures 7 and 19, the overhanging portion of front tape 11, in bearing against the inclined edge 42a, assumes an angular position with respect to the advancing path of the buckles, to counteract the twisting effect of the sewing action. More specifically, it has been observed that due to the sewing action, the relatively free sections 19 and 20 tend to rotate in counterclockwise direction (Figure 19); but the action of edge 42a serves to counteract that tendency by virtue of the fact that it engages the leading edges of said sections 19 and 20 to urge them in a clockwise direction, thereby maintaining both sections in proper operative position during the sewing action. The use of supplementary feed 39 in the line of travel of the buckles and movable (as will hereinafter appear) together with the conventional feed 136 also contributes towards the straight-line feeding movement of the two adjacent sections 19 and 20, while they are being sewn. The arrangement is hence such that the line of stitching 21 is truly transverse with respect to the longitudinal extent of short tape section 22.

The various camming and actuating mechanisms will be hereinafter described, showing how each of the feeding, looping, cutting and sewing members receive their motion. To help understand the type of these machine components, Figure 20 shows the relative limiting positions of the cams producing the above-mentioned motions. For example, it will be seen that the tape feed roller (25) begins its movement just before the buckle feed has been completed as indicated at point B, said tape feed roller (25) reaching its operative position, shown at level C, after the buckle feed has been discontinued. The pusher blade (29) begins to move after the completion of the tape feeding operation, but while the tape feed roller is still moving to its retracted position. When the pusher blade reaches its uppermost position, represented by D, neither the buckle nor the tape is being operatively fed. The cut-off takes place at point E, which occurs after the pusher blade has been fully retracted—although the movable cutting blade begins its motion towards its limiting position E while the pushing blade is being retracted. The sewing takes place at the operative projected position of the pressor foot as indicated at level F, level G indicating the raised or inoperative position of the pressor foot. The sewing thus occurs while the buckle feed member is being retracted, so that the advancing movement of the threaded buckle at this point is caused only by the feeding action of the sewing machine feed members 39 and 136. It is thus apparent that there is complete synchronization between the various components performing the steps of my invention as above described.

Figure 21:
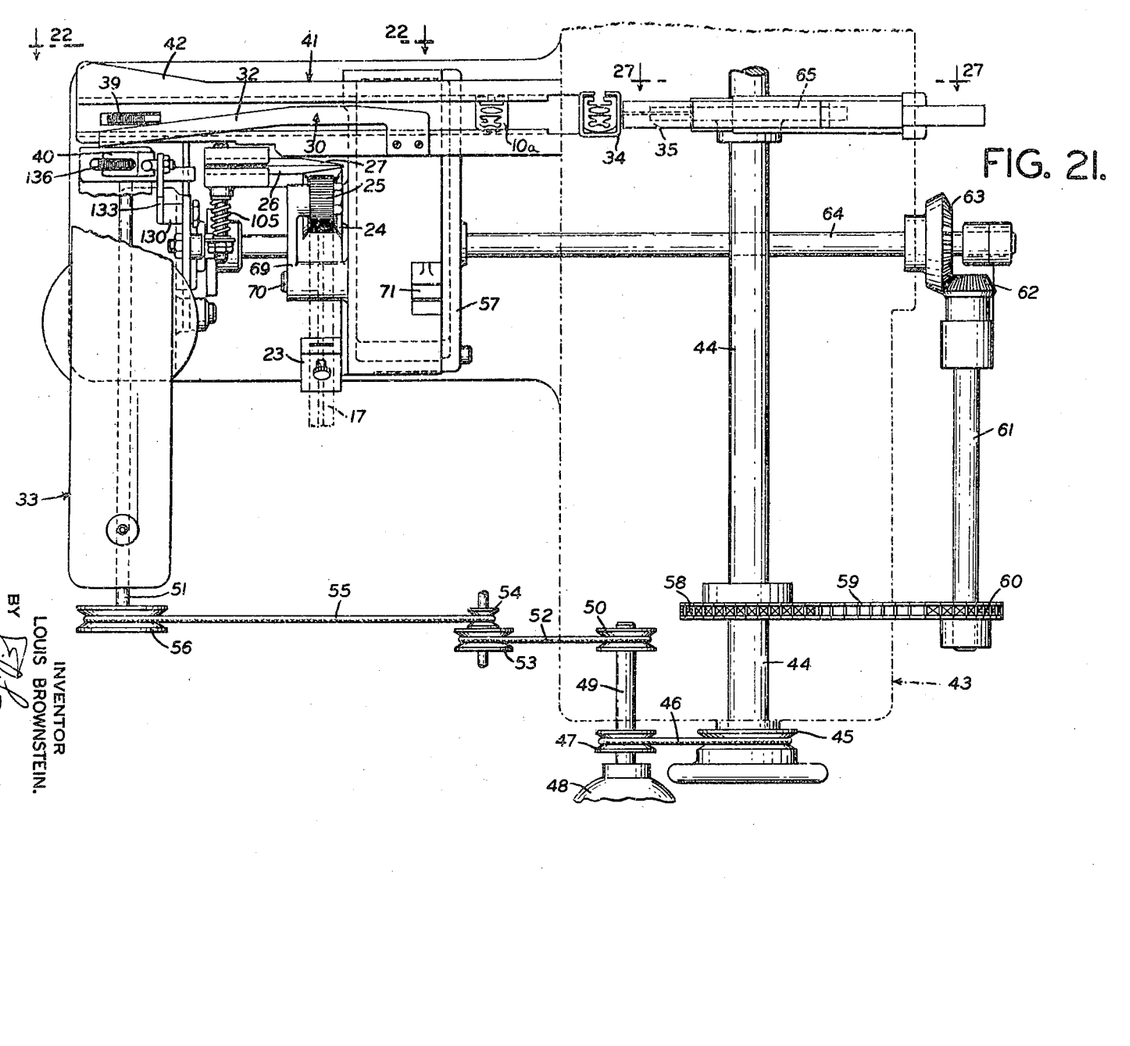
Figure 21 is a plan view of the apparatus of my present invention and certain components thereof constituting part of the apparatus of the said parent application, part of the casing housing the apparatus of said parent application being shown by dot-dash lines, and certain components thereof being omitted.
Figure 22:
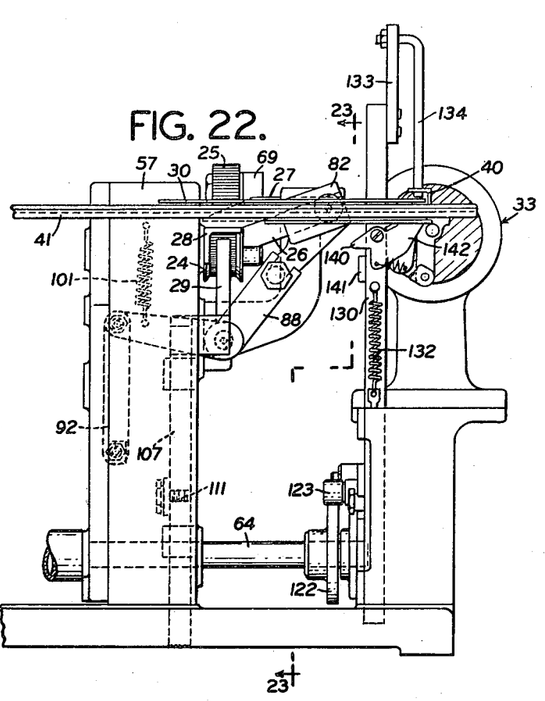
Figure 22 is a side elevation of a portion of the apparatus of Figure 21 looking in the direction of arrows 22—22, part of the sewing machine being broken away for clarity.

Referring specifically to the apparatus shown in Figure 21, the dot-dash lines 43 represent the casing, substantially like that employed in my said prior invention, housing various drive and camming mechanisms, including the main shaft 44 connected to pulley 45 which is driven through the belt 46 and pulley 47 by the motor 48. The motor shaft 49 carries the pulley 50, the rotation of which is transmitted to the sewing machine shaft 51 by belt 52, pulleys 53 and 54, belt 55 and pulley 56—said shaft 51 being operatively connected to the said sewing machine 33. Mounted on main shaft 44 is sprocket wheel 58, which is connected by sprocket chain 59 to the sprocket wheel 60 fixedly secured to the auxiliary shaft 61 carrying at the terminal thereof the spur gear 62. The latter is in operative engagement with the bevel gear 63 affixed to shaft 64 extending through the casing 57 and operatively connected to tape feeding, cutting and pushing mechanisms, as well as the presser foot and feed mechanisms of the sewing machine 33, as will more clearly hereinafter appear. Also mounted on main shaft 44 is the cam 65 (see Figures 21 and 27) which actuates mechanisms for operating the aforesaid buckle push member 35, in a manner to be more specifically set forth hereinafter.

The said tape feeding rollers 24 and 25 are adapted to receive therebetween, as aforesaid, the tape 17, for feeding the tape towards the platform 41. Roller 24, mounted on shaft 66, is positioned to receive upon the knurled peripheral surface 24a thereof the pressure of said upper roller 25, which is movable between an upper retracted position, as shown by the full-line position of Figure 28, and a lower position in which it exerts pressure upon roller 24, as shown by the dot-dash position of roller 25 in said figure. The outer peripheral surface 67 of upper roller 25 is knurled or otherwise roughened so that, when engaging the tape operatively disposed between rollers 24 and 25, it will frictionally cooperate with roller 24 in advancing the tape. The said upper roller 25 is mounted on shaft 68 which is supported by rocker arm 69 affixed to shaft 70, the latter being operatively supported by the follower arm 71 the bifurcated terminal 71a thereof supporting the transverse pin 72a carrying the follower roller 72 (see Figure 24). The latter is yieldably urged against the peripheral surface 73 of cam 74 by the spring 75 attached to the framework 76 of the machine.

Figure 23:
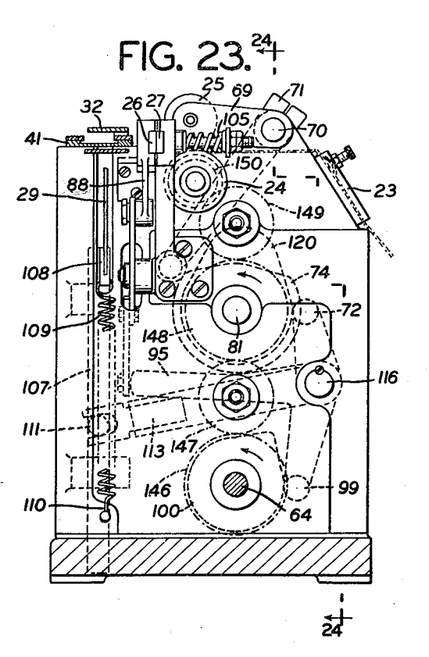
Figure 23 is a section of Figure 22 taken substantially along lines 23—23.

The low peripheral portion 77 of cam 74 extends between points 78 and 79, the balance 80 of the peripheral surface of cam 74 constituting the high portion of the cam. The arrangement is hence such that during the operative rotation of cam 74, mounted upon shaft 81, the follower arm 71 will move between the full line and dot-dash positions shown in Figure 28, thereby correspondingly actuating the rocker arm 69 and the upper roller 25 between their said respective full line and dot-dash line limiting positions shown in said figure. During such time as roller 25 is in the said dot-dash position, it is in engagement with the tape therebelow, and, as aforesaid, effects a feeding movement of said tape. When roller 25 is in its upper inoperative position, the tape is held from being fed by the operative rotation of roller 24 through the resisting action of the said tensioning device 23 (Figures 8, 23), the operation of which is substantially like the corresponding part described in the parent application and well known to those skilled in the art.

Figures 24, 25, 26:
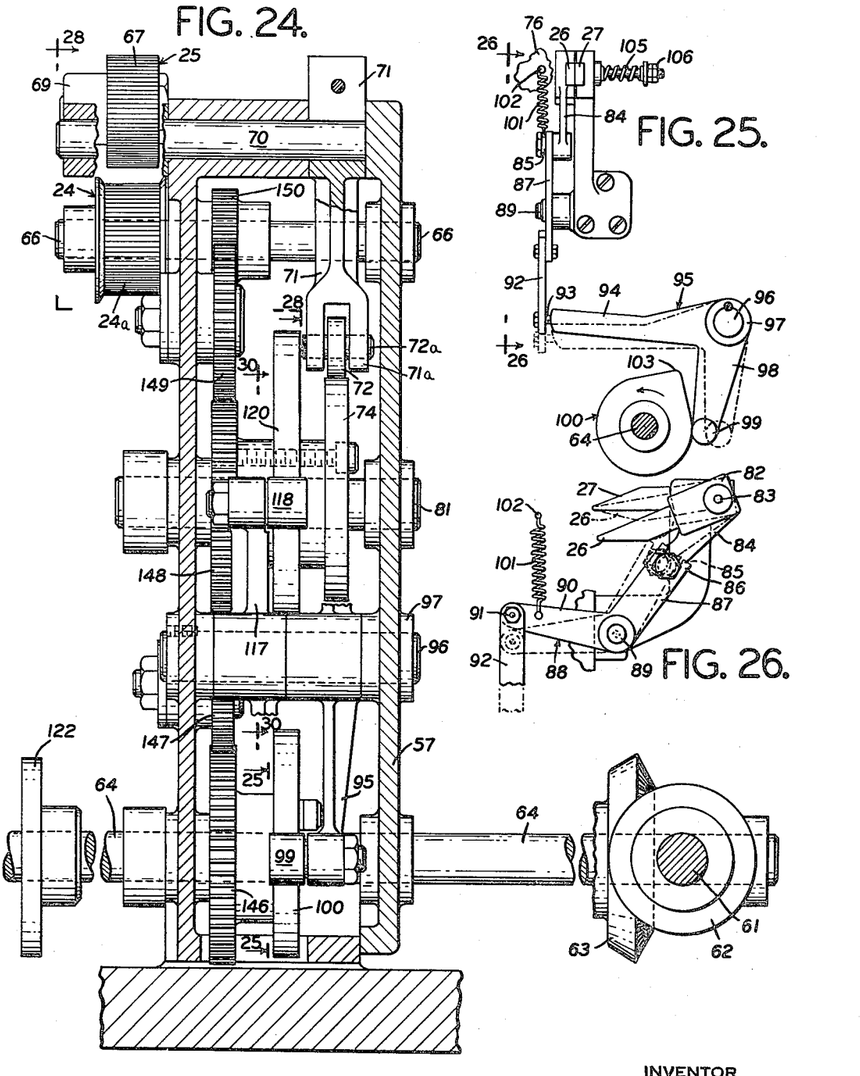
Figure 24 is an enlarged fragmentary section taken substantially along line 24—24 of Figure 23.
Figure 25 is a fragmentary section of Figure 24 taken along line 25—25, showing the cam-operated tape cutting mechanism.
Figure 26 is a fragmentary side view of Figure 25 looking in the direction of arrows 26—26.

The device for operating the tape cutting mechanism, the cutting blades of which were previously referred to by the numerals 26 and 27, is illustrated in Figures 25, 26, 22 and 24. Cutting blade 27 is stationary, whereas cutting blade 26 is attached to the block 82 mounted upon shaft 83, the arrangement being such that block 82 together with blade 26 can, in a manner to be described, operatively move from its retracted full-line position shown in Figure 26 to the dot-dash position illustrated therein. When the tape is operatively disposed between said cutting blades when they are apart, it will be permitted to move therepast—and will be severed when said cutting blade 26 is brought into operative cutting relation to blade 27. Fixedly connected to block 82 is arm 84, the latter carrying a pin 85 extending through the bifurcated terminal 86 of arm 87, the latter constituting part of bell-crank 88 rotatably mounted upon shaft 89. Arm 90 of said bell-crank has its terminal pivotally connected at 91 to the link 92, the lower terminal of which is pivotally connected at 93 to arm 94 of bell-crank follower 95 (Figure 25). The latter is fixedly mounted on shaft 96 which is rotatably supported by bearing means 97. Arm 98 of bell-crank follower 95 carries the roller 99, which is yieldably held against the peripheral surface of cam 100 by the action of spring 101 connected between the framework of the machine at 102 and the arm 90 of bell-crank 88. During the operative rotation of cam 100, the high portion 103 thereof will actuate the bell-crank 95 to the dot-dash positions shown in Figure 25, carrying the link 92 downwardly. This causes a counter-clockwise rotation of said bell-crank 88, whereby the bifurcated terminal 86 (Figures 22 and 26) will urge the pin 85 generally upwardly, to cause a clockwise rotation of cutting blade 26 to the dot-dash position shown in Figure 26. Spring 105, tensioned by nuts 106, serves to keep the two blades 26 and 27 in pressing engagement, in known manner.

Figures 27, 28, 29, 30, 31, 32, 33:
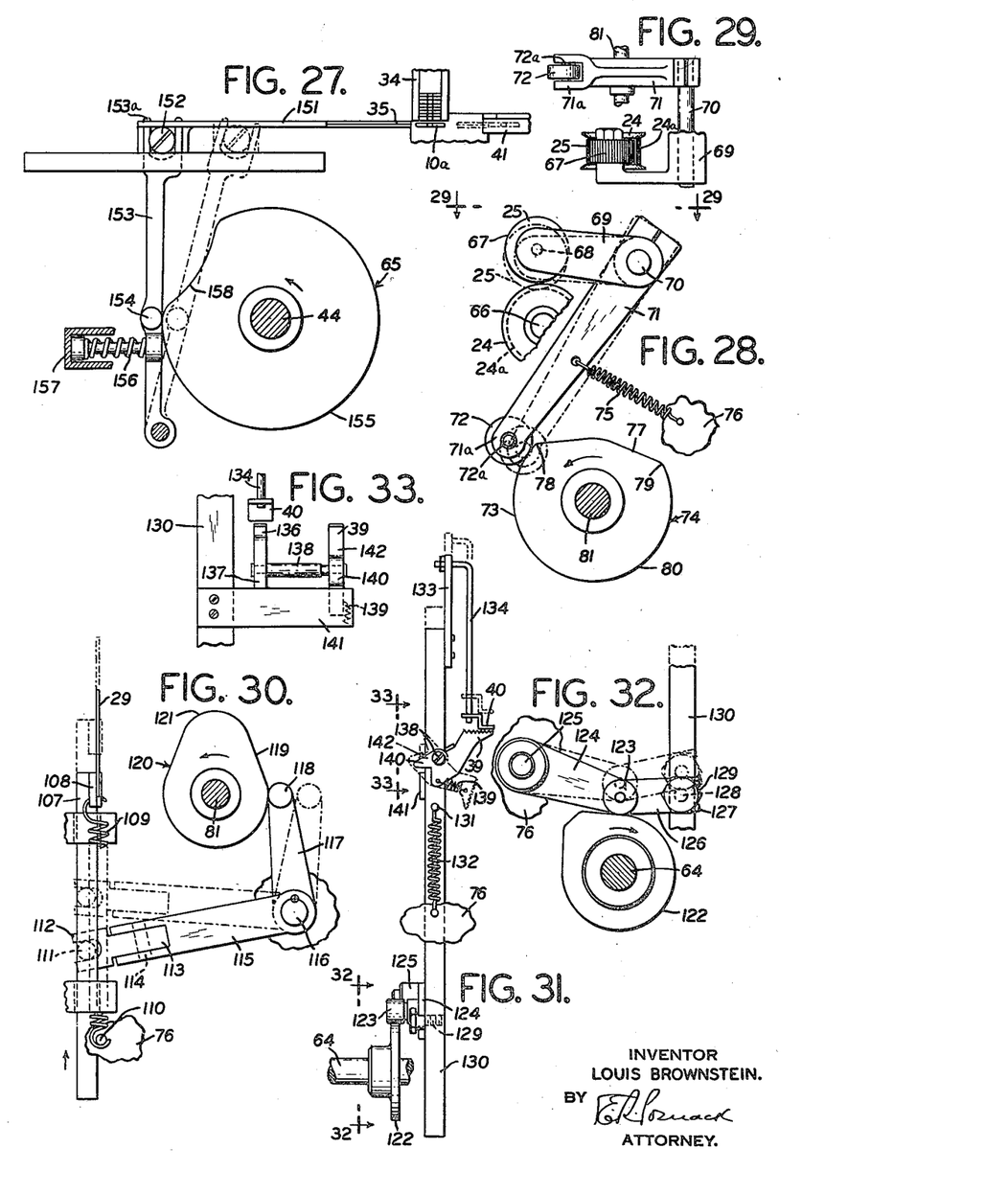
Figure 27 is a fragmentary section of Figure 21 taken substantially along line 27—27, showing the cam-operated buckle push member, the dot-dash and full line positions indicating the respective limiting positions of the parts.
Figure 28 is a fragmentary side view of Figure 24 looking in the direction of arrows 28—28, showing the cam-operated feed roller mechanism, the dot-dash lines indicating the parts in their operative feeding position, and the full lines showing the parts in their retracted position.
Figure 29 is a fragmentary end view of Figure 28 looking in the direction of arrows 29—29.
Figure 30 is a fragmentary section of Figure 24 taken along line 30—30, showing the cam-operated tape push member, with dot-dash and full line positions indicating the parts in their respective operative and retracted positions.
Figure 31 is a front elevational view of the cam-operated presser foot and sewing feed mechanism, substantially as shown in the assembly in Figure 22, the dot-dash lines showing the presser foot and sewing machine feed in their respective retracted positions.
Figure 32 is a fragmentary section of Figure 31 taken substantially along line 32—32.
Figure 33 is a fragmentary side view of Figure 31 looking substantially in the direction of arrows 33—33.

The aforesaid pusher member 29 is mounted on vertical bar 107, to the lug 108 of which is connected the spring 109 the lower portion 110 of which is anchored to the framework 76, said spring normally urging the bar 107 and the push member 29 downwardly from the upper dot-dash operative position shown in Figure 30. The said bar 107 carries the pin 111 which extends through the bifurcated terminal 112 of arm 113 pivotally mounted on transverse pin 114 carried by arm 115, the latter being fixedly mounted on shaft 116 carrying the follower arm 117, the terminal roller 118 thereof being in engagement with the peripheral operative surface 119 of cam 120, said cam being mounted upon shaft 81. Upon the operative rotation of the latter cam, the high portion generally designated 121 will urge the arm 117 into the dot-dash position shown in Figure 30, against the action of spring 109. Such movement is transmitted through arm 115 and associated parts to the push member 29, to bring it up to its projected upper position illustrated.

Extending through and beyond said casing 57 is the said shaft 64, the latter having mounted thereon the presser foot cam 122 (Figures 24, 31 and 32), the peripheral portion of which is in engagement with the roller 123 mounted upon the terminal of arm 124, the latter being pivotally mounted at 125 of the framework 76. The said arm 124 contains the angulated portion 126, the bifurcated portion 127 of which embraces the shank 128 of bolt 129 attached to the vertical bar 130. Attached to said bar at 131 is the spring 132 which is anchored to the framework 76, said spring normally urging said bar 130 downwardly whereby said roller 123 is yieldably held against the peripheral surface of said cam 122. Attached to the upper portion of bar 130 is the extension 133 carrying the presser foot rod 134, the presser foot 40 being supported at the bottom thereof. It is thus apparent that upon operative rotation of cam 122, said bar 130, together with presser foot 40 operatively associated therewith, are brought into respective upper retracted and lower operative positions.

The conventional sewing machine main feed member 136 is disposed below the presser foot 135 when the latter is in its lowered operative position shown in Figures 18 and 33, said feed member being integral with the feed member carrier 137 mounted on shaft 138, said carrier 137 being operatively actuated, by a conventional mechanism not shown, to produce the well-known rotary feeding movement of carrier 137 and the main feed member 136 carried thereby.

The said auxiliary sewing machine feed 39 is carried by auxiliary feed carrier 142, rotatably mounted on shaft 138 which, as aforesaid, is affixed to the main feed carrier 137 (see Figures 18, 31 and 33). The arrangement is hence such that with the conventional feed movement of carrier 137, and main feed 136, the auxiliary feed 39 will be caused to make a corresponding feeding movement, so that the feeding actions of both feeds are simultaneous, as aforesaid.

A spring 139, anchored to the framework 76, is attached to the auxiliary carrier 142, and rotatably urges it into its operative position with the auxiliary feed 39 in its upper position. The said rotatably mounted carrier 142 contains a lip 140 which is normally disposed over actuator bar 141 affixed to vertical bar 130. The arrangement is hence such that when the vertical bar 130 is operatively moved upwardly by the action of cam 122, the said actuator bar 141 will engage the lip 140, whereby said carrier 142 and its feed member 39 will be rotatably actuated in a clockwise direction to the retracted dot-dash position shown in Figure 31, against the action of said spring 139. Thus the presser foot 40 and the main and auxiliary feeds 136 and 39, respectively, are simultaneously moved into their respective operative and retracted positions—since the two feed assemblies are both carried by shaft 138; but the tripping action of feed 39 is independently accomplished by bar 141, as above described.

As aforesaid, the said shaft 64 actuates the tape feed, pusher member and cut-off mechanism. Connection between the said shaft 64 and the cams for such various mechanisms is illustrated in Figure 24. Operatively mounted at said shaft 64, within casing 57, is a gear 146, as well as the cut-off cam 100. Said gear 146 is in engagement with the idler gear 147, the latter being in engagement with gear 148 mounted on said shaft 81, which also supports the said pusher cam 120 and the feed cam 74. Gear 148 is in engagement with idler 149, which in turn is in engagement with gear 150 mounted on shaft 66 which carries the roller 24. It is thus apparent that the operative rotation of shaft 64 causes operative rotation of cams 100, 120 and 74 within the casing 65, as well as the feed roller 24 and the presser foot cam 122. The timed relation between said cams appears in Figure 20, previously referred to.

Shaft 44, as previously indicated, operatively rotates the buckle feed cam 65, thus operating the buckle push member 35, substantially in the manner described in said parent application. Said buckle pusher 35 (Figure 27) is connected to the horizontal bar 151 which carries the pin 152. Embracing said pin is the bifurcated terminal portion 153a of follower arm 153, the intermediate roller 154 of which is held in engagement with the peripheral surface 155 of cam 65 by the action of spring 156 bearing against arm 153 and anchored within the bracket 157, substantially in the manner of said prior application. The low portion of the cam generally designated 158 permits the roller 154 and the follower arm 153 to move to the right, under the action of said spring 156, whereby the bar 151 and the buckle pusher 35 are projected towards the buckle magazine 34, to engage the lowermost buckle 10a and slide it forwardly to the platform 41 adjacent to magazine 34 and within the path 36 illustrated in Figure 6.

In the operation of the mechanism of this apparatus, the successive operative movements of buckle push member 35 cause the buckles engaged thereby to advance, each buckle as it is being ejected from magazine 34 engaging the previous buckle and advancing it a distance equal to the width of the buckle, in the manner aforesaid. With each such advance, caused by the primary action of shaft 44, there are corresponding operative movements of the said tape feed cam 74, cut-off cam 100, pusher cam 120, tape rollers 24 and 25, and presser foot cam 122. Since the presser foot cam is operatively connected, in the manner described, with the conventional sewing machine feed 136 and supplementary feed 39, and since the drive for the sewing machine 33, through shaft 51, is also coactively connected with shaft 44, it is apparent that all the operative movements of the machine parts, and their abovedescribed steps, are interconnected through the said main shaft 44. The arrangement of cams, and their relative positioning, are such as to give a specific predetermined timed relationship between the respective movements of such components, as illustrated in Figure 20—to carry out the objectives of this invention.

Specifically, as the buckles, already carrying the front tapes 11, are advanced by the action of the buckle pusher 35 and associated parts, each buckle assumes successive stations to enable the various threading and sewing operations to be performed. The order of events has previously been described and, as aforesaid, complies generally—in the preferred method of practicing my invention—with the cam timing diagram of Figure 20. The sewing machine continuously operates, but no sewing is effected until the presser foot 40 and feeds 136 and 39 are in operative position; and, since these are in such operative positions only by virtue of the intermittent operation of their respective cams, the sewing occurs only in accordance with the above-mentioned cam setting.

It is thus apparent that this invention is adapted for coactive use with my prior invention, whereby a buckle previously threaded thereby can be carried into the mechanism of my present invention without interruption, for effecting the threading of a second short tape through the rear slot and also performing a sewing operation in a truly transverse direction upon the latter tape.

In the above description, the invention has been disclosed merely by way of example and in preferred manner; but obviously many variations and modifications may be made therein. It is to be understood, therefore, that the invention is not limited to any specific form or manner of practicing same, except insofar as such limitations are specified in the appended claims.

I claim:

1. In a method of threading a flexible tape through a buckle having a transverse slot and forming a closed loop of said threaded tape, the steps of positioning said buckle at a predetermined threading station, feeding a length of said tape along a predetermined feed line toward said station and adjacent said transverse slot of the buckle, pushing a predetermined advance portion of the tape through said slot, maintaining the remaining trailing portion of the tape in a generally rearwardly direction, folding said pushed-through advance portion rearwardly into adjacent relation to said trailing portion, thereby forming two adjacent rearwardly extending sections, moving the buckle and said threaded tape towards a predetermined sewing station, and sewing said adjacent sections together, to form a closed loop.

2. In a method of threading a flexible tape through a buckle having a transverse slot and forming a closed loop of said threaded tape, the steps of positioning said buckle at a predetermined threading station, feeding a length of said tape along a predetermined feed line toward said station and below said transverse slot of the buckle, pushing a predetermined advance portion of the tape upwardly through said slot, maintaining the remaining trailing portion of the tape in a generally rearwardly direction below said buckle, moving the buckle and said tape to a predetermined sewing station and during said movement folding said pushed-through portion rearwardly into adjacent relation to said trailing portion, thereby forming adjacent upper and lower rearwardly extending sections, and sewing said upper and lower sections together by a transverse line of stitching, to form a closed loop.

3. In a method of threading a flexible tape through a buckle having a transverse slot and forming a closed loop of said threaded tape, the steps of positioning said buckle at a predetermined threading station, feeding a length of said tape horizontally along a predetermined feed line toward said station and below said transverse slot of the buckle, pushing a predetermined advance portion of the tape upwardly through said slot, maintaining the remaining trailing portion of the tape in a generally rearwardly direction below said buckle, moving the buckle and said tape to a predetermined sewing station and during said movement folding said pushed-through portion rearwardly into adjacent relation to said trailing portion, thereby forming adjacent upper and lower rearwardly extending sections, maintaining said upper and lower sections in a substantially horizontal plane and in contiguous relation, and sewing said sections together by a transverse line of stitching to form a closed loop.

4. In a method of threading a flexible tape through a buckle having a transverse slot and forming a closed loop of said threaded tape, the steps of positioning said buckle at a predetermined threading station, feeding a continuous length of said tape forwardly past a predetermined cutting station, conveying the advance portion of said tape in front of said cutting station forwardly, discontinuing said feeding action, severing said tape at said cutting station, conveying the severed advance portion of the tape along a predetermined line of feed toward said threading station and below said transverse slot of the buckle, pushing said advance portion of the tape upwardly through said slot, maintaining the remaining trailing portion of the tape in a generally rearwardly direction below said buckle, moving the buckle and said tape to a predetermined sewing station, folding said pushed-through portion rearwardly into adjacent relation to said trailing portion, thereby forming adjacent upper and lower rearwardly extending sections, and sewing said upper and lower sections together by a transverse line of stitching, to form a closed loop.

5. In a method of threading a rear flexible tape through the rear portion of a transversely slotted buckle and forming a closed loop of said threaded tape, the front portion of said buckle having a front tape threaded therethrough, the steps of positioning said buckle at a predetermined threading station, feeding a length of said rear tape along a predetermined feed line toward said station and below a predetermined rear slotted portion of the buckle, pushing a predetermined advance portion of said rear tape through said rear slotted portion, maintaining the remaining trailing portion of said rear tape in a generally rearwardly direction, maintaining the portion of said front tape adjacent the buckle in a generally forwardly direction, folding said pushed-through advance portion of the rear tape rearwardly into adjacent relation to said trailing portion, thereby forming two adjacent rearwardly extending sections, moving the buckle with said two threaded portions towards the region of a predetermined sewing station, positioning said two adjacent sections of said rear tape at said sewing station, and sewing said adjacent sections together, to form a closed loop.

6. In a method of threading a rear flexible tape through the rear portion of a transversely slotted buckle and forming a closed loop of said threaded tape, the front portion of said buckle having a front tape threaded therethrough, the steps of positioning said buckle at a predetermined threading station, feeding a length of said rear tape along a predetermined feed line toward said station and below a predetermined rear slotted portion of the buckle, pushing a predetermined advance portion of said rear tape through said rear slotted portion, maintaining the remaining trailing portion of said rear tape in a generally rearwardly direction, maintaining the portion of said front tape adjacent the buckle in a generally forwardly direction, folding said pushed-through advance portion of the rear tape rearwardly into adjacent relation to said trailing portion, thereby forming two adjacent rearwardly extending sections, moving the buckle with said two threaded portions towards the region of a predetermined sewing station and at the same time supporting progressively increasing lengths of said front tape in a substantially horizontal direction, positioning said two adjacent sections of said rear tape at said sewing station, and sewing said adjacent sections together, to form a closed loop.

7. In a method of threading a rear flexible tape through the rear portion of a transversely slotted buckle and forming a closed loop of said threaded tape, the front portion of said buckle having a front tape threaded therethrough, the steps of progressively moving said buckle and front tape assembly towards a predetermined threading station, positioning said assembly at said threading station, feeding a length of said rear tape along a predetermined feed line toward said station and below a predetermined rear slotted portion of the buckle, pushing a predetermined advanced portion of said rear tape through said rear slotted portion, maintaining the remaining trailing portion of said rear tape in a generally rearwardly direction, maintaining the portion of said front tape adjacent the buckle in a generally forwardly direction, folding said pushed-through advance portion of the rear tape rearwardly into adjacent relation to said trailing portion, thereby forming two adjacent rearwardly extending sections, during said folding operation moving the buckle with said two threaded portions towards the region of a predetermined sewing station and at the same time supporting said front tape portion of the buckle and said adjacent sections of the rear tape in substantially horizontal planes, positioning said two adjacent sections of said rear tape at said sewing station, and sewing said upper and lower sections together by a transverse line of stitching to form a closed loop.

8. In a method of threading a flexible tape through a buckle having a transverse slot and forming a closed loop of said threaded tape, the steps of positioning said buckle at a predetermined threading station, feeding a length of said tape along a predetermined feed line toward said station and below said transverse slot of the buckle, pushing a predetermined advance portion of the tape upwardly through said slot, maintaining the remaining trailing portion of the tape in a generally rearwardly direction below said buckle, moving the buckle and said tape to a predetermined sewing station and during said movement folding said pushed-through portion rearwardly into adjacent relation to said trailing portion, thereby forming adjacent upper and lower rearwardly extending sections, sewing said upper and lower sections together by a transverse line of stitching, and during said sewing step simultaneously feeding two spaced portions of said adjacent sections in parallel operative directions.

9. In an apparatus for threading a flexible tape through a buckle having a transverse slot and forming a closed loop of said threaded tape, the combination of a platform for operatively supporting said buckle, a portion of the platform constituting a threading station, tape feeding means for moving said tape along a predetermined line of feed extending below said station, a movable tape pusher blade normally in an operatively retracted limiting position below said station and below said transverse slot of said buckle when operatively disposed on the station, and positioned for movement upwardly through said slot into an operatively raised limiting position, thereby to push a section of said tape upwardly through said slot, means to actuate said pusher blade between its said limiting positions, a sewing machine adjacent the said platform at a region forwardly of said threading station, buckle actuating means for operatively moving buckles on said platform forwardly along a path of travel from said threading station to the region of said sewing machine, and folding means above said platform and disposed between said threading station and said sewing machine region, said folding means having a portion thereof positioned operatively to engage said tape section when extending upwardly through said slot, said sewing machine being disposed laterally with respect to said buckle path of travel along said platform.

10. In an apparatus for threading a flexible tape through a buckle having a transverse slot and forming a closed loop of said threaded tape, the combination according to claim 9, said folding means comprising a bar extending generally longitudinally above said platform and having a tape-engaging portion thereof disposed angularly with respect to the buckle path of travel and inclined generally towards said sewing machine.

11. In an apparatus for threading a flexible tape through a buckle having a transverse slot and forming a closed loop of said threaded tape, the combination according to claim 9, said bar having a rear portion thereof disposed substantially parallel to said buckle path of travel, and a forward portion disposed angularly with respect thereto and inclined generally towards said sewing machine, one edge of the angular portion of said bar facing said sewing machine and intercepting the path of travel of said buckles.

12. In an apparatus for threading a flexible tape through a buckle having a transverse slot and forming a closed loop of said threaded tape, the combination of a platform for operatively supporting said buckle, a portion of the platform constituting a threading station, tape feeding means for moving said tape along a predetermined line of feed extending below said station, said tape feeding means comprising two coacting feed rollers positioned for operative engagement with said tape substantially at said line of feed, intermittent actuating means for said tape feeding means, a supporting bar below the level of said station and substantially along said line of feed, for supporting engagement with the tape operatively disposed on said line of feed, a movable tape pusher blade normally in an operatively retracted limiting position below said station and below said transverse slot of said buckle when operatively disposed on the station, and positioned for movement upwardly through said slot into an operatively raised limiting position, thereby to push a section of said tape upwardly through said slot, means to actuate said pusher blade between its said limiting positions, a sewing machine adjacent the said platform at a region forwardly of said threading station, buckle actuating means for operatively moving buckles on said platform forwardly along a path of travel from said threading station to the region of said sewing machine, and folding means above said platform and disposed between said threading station and said sewing machine region, said folding means comprising a bar extending generally longitudinally above said platform and having a tape-engaging portion thereof disposed angularly with respect to the buckle path of travel and inclined generally towards said sewing machine, said sewing machine being disposed laterally with respect to said buckle path of travel along said platform.

13. In an apparatus for threading a flexible tape through a buckle having a transverse slot and forming a closed loop of said threaded tape, the combination of a platform for operatively supporting said buckle, a portion of the platform constituting a threading station, tape feeding means for moving said tape along a predetermined line of feed extending below said station, a tape cutter disposed between said tape feeding means and said station and movable across said line of feed, means to operate said cutter for severing said tape when disposed along said line of feed, a movable tape pusher blade normally in an operatively retracted limiting position below said station and below said transverse slot of said buckle when operatively disposed on the station, and positioned for movement upwardly through said slot into an operatively raised limiting position, thereby to push a section of said tape upwardly through said slot, means to actuate said pusher blade between its said limiting positions, a sewing machine adjacent the said platform at a region forwardly of said threading station, buckle actuating means for operatively moving buckles on said platform forwardly along a path of travel from said threading station to the region of said sewing machine, and folding means above said platform and disposed between said threading station and said sewing machine region, said folding means having a portion thereof positioned operatively to engage said tape section when extending upwardly through said slot, said sewing machine being disposed laterally with respect to said buckle path of travel along said platform.

14. In an apparatus for threading a flexible tape through a buckle having a transverse slot and forming a closed loop of said threaded tape, the combination according to claim 9, said sewing machine having a presser foot and two feed members operatively coacting therewith, said feed members being spaced from each other transversely with respect to said buckle path of travel, and means to actuate said feed members simultaneously.

15. In an apparatus for threading a flexible tape through a buckle having a transverse slot and forming a closed loop of said threaded tape, the combination according to claim 9, said sewing machine having a presser foot, a main feed member coactively connected to said presser foot, a supplementary feed member spaced from said main feed member transversely with respect to said buckle path of travel, and connecting means between said two feed members, whereby said members will operate simultaneously.

16. In an apparatus for threading a flexible tape through a buckle having a transverse slot and forming a closed loop of said threaded tape, the combination according to claim 9, said sewing machine having a presser foot, a vertical bar supporting said presser foot and movable between upper and lower limiting positions, a main feed member, a carrier supporting said main feed member, a shaft supporting said carrier, means to actuate said bar and carrier whereby said main feed member and presser foot are cooperatively actuated, a supplementary feed member spaced from said main feed member transversely with respect to said buckle path of travel, and an auxiliary carrier supporting said supplementary feed member and rotatably mounted on said shaft, whereby said feed members will operate simultaneously.

17. In an apparatus for threading a flexible tape through a buckle having a transverse slot and forming a closed loop of said threaded tape, the combination according to claim 9, said sewing machine having a presser foot, a vertical bar supporting said presser foot and movable between upper and lower limiting positions, a main feed member, a carrier supporting said main feed member, a shaft supporting said carrier, means to actuate said bar and carrier whereby said main feed member and presser foot are cooperatively actuated, a supplementary feed member spaced from said main feed member transversely with respect to said buckle path of travel, and an auxiliary carrier supporting said supplementary feed member and rotatably mounted on said shaft, said auxiliary carrier being rotatably movable between an operative position and a retracted position, yieldable means urging said auxiliary carrier into its operative position, and an actuator bar carried by said vertical bar and engageable with said auxiliary carrier upon an operative movement of said vertical bar to rotatably actuate said auxiliary carrier to its retracted position against the action of said yieldable means.

18. In an apparatus for threading a rear flexible tape through the rear portion of a transversely slotted buckle and forming a closed loop of said threaded tape, the front portion of said buckle having a front tape threaded therethrough, the combination of a platform for operatively supporting said buckle along a predetermined buckle path, said platform having a rear station, an intermediate threading station, and a forward sewing station, a buckle feed member engageable with said front-threaded buckle when at said rear station, means to actuate said buckle feed member forwardly a distance equal to the width of said buckle, whereby an operative movement of said member will cause said buckle to move forwardly on said platform a distance equal to the width of the buckle, tape feeding means for moving said rear tape along a predetermined line of feed extending below said intermediate station, a movable tape pusher blade normally in an operatively retracted limiting position below said station and below said intermediate station and below said rear slotted portion of the buckle when operatively disposed on said intermediate station, and positioned for movement upwardly through said rear slotted portion into an operatively raised limiting portion, thereby to push a section of said rear tape upwardly through said rear slotted portion, means to actuate said pusher blade between its said limiting positions, a sewing machine adjacent said sewing station, and folding means above said platform and disposed between said intermediate and sewing stations, said folding means having a portion thereof positioned operatively to engage said tape section when extending upwardly through said rear slotted portion of the buckle, said sewing machine being disposed laterally with respect to said buckle path of travel along said platform.

19. An apparatus according to claim 18, and a horizontal tape supporting member adjacent said platform and extending substantially along the length thereof, said horizontal supporting member being disposed on the side of said platform opposite that of said sewing machine, said supporting member being positioned to support said front tape during the operative movement of said buckle along its said path of travel on said platform.

20. An apparatus according to claim 18, and a horizontal tape supporting member adjacent said platform and extending substantially along the length thereof, said horizontal supporting member being disposed on the side of said platform opposite that of said sewing machine, said supporting member being positioned to support said front tape during the operative movement of said buckle along its said path of travel on said platform, said supporting member having a portion flaring outwardly and forwardly away from said sewing machine.

21. An apparatus according to claim 18, provided with cam means operatively connected to said buckle feed member, actuating means for said cam means, and sewing machine drive means operatively connected to said latter actuating means, whereby the buckle feed member and sewing machine are cooperatively actuated.

References Cited in the file of this patent

UNITED STATES PATENTS 2,715,984     Brownstein _____________ Aug. 23, 1955